(12) United States Patent
Numata et al.

(10) Patent No.: US 8,115,588 B2
(45) Date of Patent: Feb. 14, 2012

(54) OPERATING DEVICE AND GAME CONTROLLER

(75) Inventors: Tetsu Numata, Fukushima-ken (JP); Koichi Morito, Fukushima-ken (JP)

(73) Assignees: ALPS Electric Co., Ltd., Tokyo (JP); Sony Computer Entertainment, Inc., Tokyo (JP)

( * ) Notice: Subject to any disclaimer, the term of this patent is extended or adjusted under 35 U.S.C. 154(b) by 1327 days.

(21) Appl. No.: 11/796,601

(22) Filed: Apr. 27, 2007

(65) Prior Publication Data
US 2007/0281787 A1   Dec. 6, 2007

(30) Foreign Application Priority Data
May 2, 2006   (JP) .................. 2006-128746

(51) Int. Cl.
*H01C 10/00* (2006.01)
(52) U.S. Cl. ........................................ 338/68
(58) Field of Classification Search ........... 338/68, 338/83, 89, 110, 118, 172, 178, 191, 198, 338/200, 201; 200/510–512
See application file for complete search history.

(56) References Cited

U.S. PATENT DOCUMENTS

| | | | | |
|---|---|---|---|---|
| 4,652,947 | A * | 3/1987 | Oka et al. ..................... | 360/85 |
| 5,896,264 | A * | 4/1999 | Bijlenga et al. ............... | 361/106 |
| 6,352,477 | B1 * | 3/2002 | Soma et al. .................... | 463/36 |
| 6,784,383 | B2 * | 8/2004 | Sugahara et al. ............. | 200/11 R |
| 2001/0023203 | A1 | 9/2001 | Chiu-Hao | |
| 2002/0190528 | A1 | 12/2002 | Ootori | |
| 2003/0155218 | A1 * | 8/2003 | Panagl ......................... | 200/11 R |
| 2005/0012730 | A1 | 1/2005 | Niitsuma | |
| 2007/0281787 | A1 * | 12/2007 | Numata et al. ............... | 463/36 |
| 2010/0032267 | A1 * | 2/2010 | Gabathuler et al. .......... | 200/11 A |

FOREIGN PATENT DOCUMENTS

| | | |
|---|---|---|
| EP | 1493471 | 1/2005 |
| EP | 1498804 | 1/2005 |
| JP | 58-62525 | 4/1983 |
| JP | 58-170731 | 11/1983 |
| JP | 59-5842 | 1/1984 |
| JP | 61-95029 | 6/1986 |
| JP | 2-278623 | 11/1990 |
| JP | 3-61304 | 6/1991 |
| JP | 8-64080 | 3/1996 |
| JP | 9-167544 | 6/1997 |
| JP | 9-171742 | 6/1997 |
| JP | 10-118337 | 5/1998 |
| JP | 2001-84077 | 3/2001 |
| JP | 2002-182851 | 6/2002 |
| JP | 2002-318658 | 10/2002 |

OTHER PUBLICATIONS

Notification of Reason(s) for Refusal mailed Apr. 15, 2008, from the corresponding Japanese Application.
Extended European Search Report and Annex to the Extended European Search Report dated Jul. 11, 2007, for corresponding European Application EP 07 25 1805.3-2218.
Questioning dated May 26, 2009, from the corresponding Japanese Application.
Decision of Refusal dated Jul. 15, 2008, from the corresponding Japanese Application.

* cited by examiner

*Primary Examiner* — James Harvey
(74) *Attorney, Agent, or Firm* — Katten Muchin Rosenman LLP

(57) ABSTRACT

A novel game controller is provided. The game controller includes: a lower operation button supported by a rotation shaft so as to be capable of a rotating operation; a resistor arranged on an internal substrate; and a conductive member to be pressed against the resistor by a rotating operation on the lower operation button, the conductive member having elasticity. The resistor outputs an analog signal in accordance with a contact area of the conductive member, thereby realizing an analog input.

11 Claims, 10 Drawing Sheets

OPERATING DEVICE AND GAME CONTROLLER

BACKGROUND OF THE INVENTION

1. Field of the Invention

The present invention relates to an operating device and a game controller to be used for game operations or the like.

2. Description of the Related Art

Game apparatuses and game apparatus controllers to be operated by users have typically been connected to each other with cables. However, game systems have recently been proposed in which game apparatuses and controllers are connected by wireless means. The use of wireless controllers makes it possible for users to freely play games in different positions.

With technological advances in recent years, game systems have improved exponentially in terms of hardware capabilities. This makes it possible for operation inputs from game controllers to be processed in a wide variety of modes in real time. It is therefore expected that various new types of game applications will be developed in the future. Under these circumstances, it has been strongly desired to develop a game controller that allows a user to make various kinds of operation inputs.

SUMMARY OF THE INVENTION

It is thus a general purpose of the present invention to provide a novel game controller.

To address the foregoing challenge, an operating device according to one embodiment of the present invention includes: an operation button supported by a rotation shaft so as to be capable of a rotating operation; a resistor arranged on a substrate; and a conductive member to be pressed against the resistor by the rotating operation on the operation button, the conductive member having elasticity. In this operating device, the resistor outputs an analog signal in accordance with the size of a contact area with the conductive member.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10 is a diagram showing the state where the lower operation button is pressed in;

DETAILED DESCRIPTION OF THE INVENTION

The invention will now be described by reference to the preferred embodiments. This does not intend to limit the scope of the present invention, but to exemplify the invention.

Figure 1:
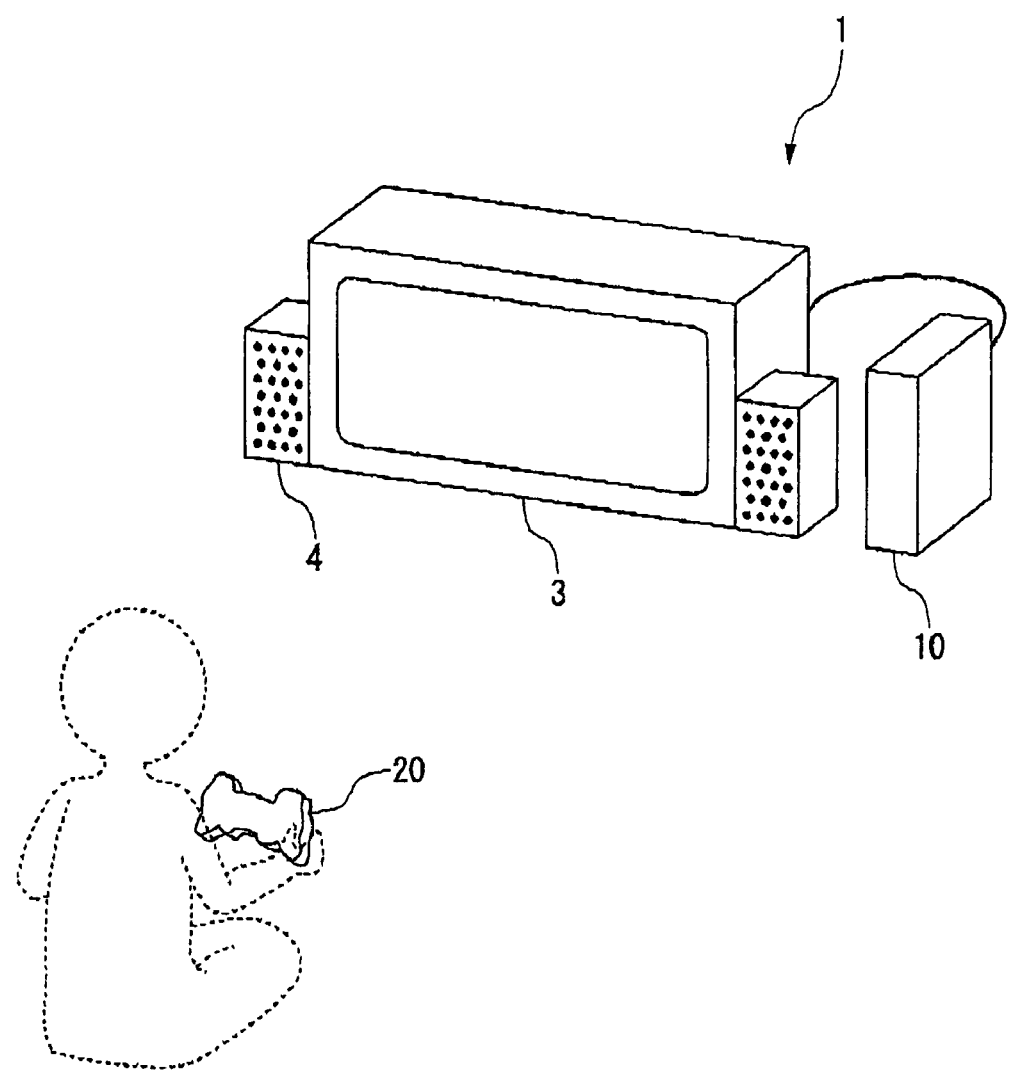
FIG. 1 is a diagram showing the use environment of a game system according to an embodiment of the present invention.

FIG. 1 shows the use environment of a game system according to an embodiment of the present invention. The game system 1 includes an image display apparatus 3, a sound output apparatus 4, a game apparatus 10, and a controller 20. The image display apparatus 3, the sound output apparatus 4, and the controller 20 are connected to the game apparatus 10.

The controller 20 is an operating device from which a user makes operation inputs. The game apparatus is a processing unit which processes a game application based on the operation inputs from the controller 20, and generates image signals showing the results of processing of the game application.

The image display apparatus 3 is a display for outputting image signals. It receives the image signals generated by the game apparatus 10, and displays a game screen. The sound output apparatus 4 consists of speakers for outputting sound. It receives sound signals generated by the game apparatus 10, and outputs game sound. The image display apparatus 3 and the sound output apparatus 4 constitute an output apparatus of the game system 1.

The game apparatus 10 and the image display apparatus 3 may be connected by either wired means or wireless means. The game apparatus 10 and the image display apparatus 3 may be connected with AV cables. Alternatively, a home network using network (LAN) cables or a wireless LAN may be constructed between the game apparatus 10 and the image display apparatus 3.

The controller 20 has the function of transmitting user's operation inputs to the game apparatus 10. In the present embodiment, it is configured as a wireless controller which is capable of wireless communication with the game apparatus 10. The controller 20 and the game apparatus 10 may establish wireless communication therebetween using Bluetooth™ protocol. The game apparatus 10 can hold wireless communications with a plurality of controllers 20. In other words, the game system 1 can realize one-to-N connection between the game apparatus 10 and controllers 20. The game apparatus 10 functions as a master unit. The controller 20 functions as a slave unit. It should be appreciated that the controller 20 is not limited to a wireless controller, but may be a wired controller which is connected to the game apparatus 10 through a cable.

The controller 20 is driven by a not-shown battery, and includes a plurality of buttons and keys for making operation inputs for game progress. When the user operates the buttons and keys on the controller 20, the operation inputs are transmitted to the game apparatus 10 wirelessly. The game apparatus 10 receives the operation inputs pertaining to the game application from the controller 20, controls the progress of the game according to those operation inputs, and generates game image signals and game sound signals. The game image signals and game sound signals generated are output from the image display apparatus 3 and the sound output apparatus 4, respectively. The game apparatus 10 also has the function of transmitting a vibration control signal to the controller 20 to cause the controller 20 to vibrate depending on the progress of the game application. The controller 20 contains a vibrator, and makes the vibrator vibrate when it receives the vibration control signal.

Figure 2:
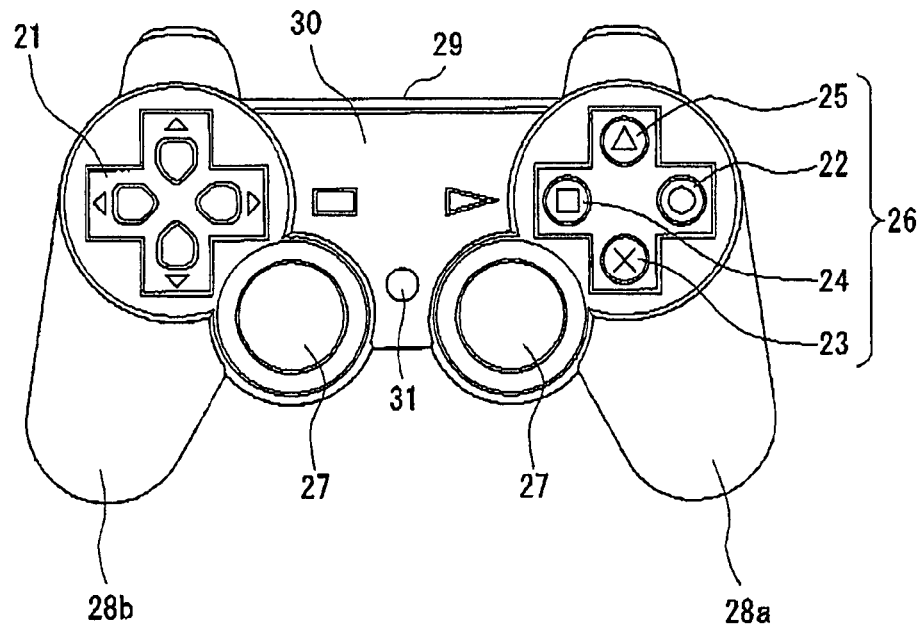
FIG. 2 is a diagram showing the appearance and configuration of a controller.

FIG. 2 shows the appearance and configuration of the controller. The controller 20 has an arrow key 21, analog sticks 27, and four types of operation buttons 26. The arrow key 21, the analog sticks 27, and the operation buttons 26 constitute an input unit which is arranged on the case top 30. The four types of buttons 22 to 25 are marked with different symbols in different colors in order to distinguish them from each other. More specifically, the ○ button 22 is marked with a red circle, the x button 23 a blue cross, the □ button 24 a purple square, and the Δ button 25 a green triangle. The rear 29 of the case of the controller 20 is provided with a plurality of LEDs.

The user holds a left grip 28b with the left hand and a right grip 28a with the right hand when operating the controller 20. The arrow key 21, the analog sticks 27, and the operation buttons 26 are arranged on the case top 30 so that they can be operated by the user who is holding the left grip 28b and the right grip 28a.

An LED button 31 is also provided on the case top 30. The LED button 31 is used, for example, to display a menu screen on the image display apparatus 3. It also has the functions of notifying the user of incoming mails, and indicating the battery level and other status of the controller 20 by modifying the lighting status of the LED. For example, the LED is lit in red during charging, lit in green when fully charged, and blinks in red when the battery level is low.

Figure 3:
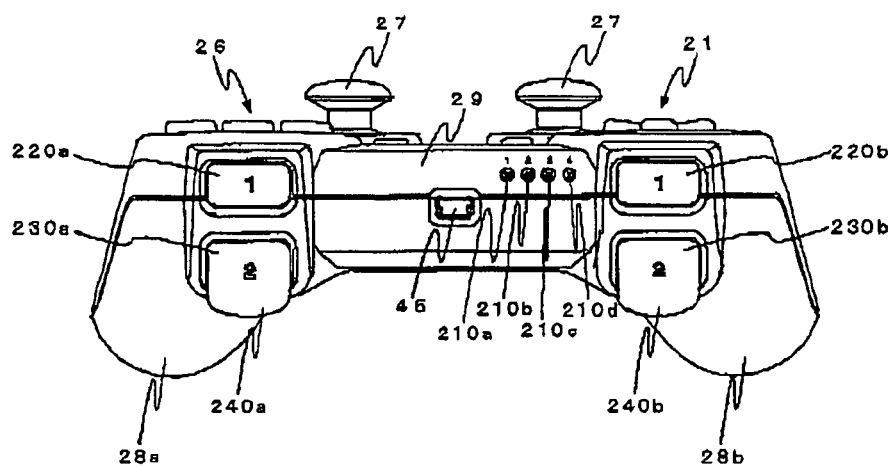
FIG. 3 is a diagram showing the appearance and configuration of the controller according to the embodiment when viewed from the rear.

FIG. 3 shows the appearance and configuration of the controller according to the embodiment when viewed from the rear side. The back 29 of the case of the controller 20 is provided with a plurality of LEDs. When viewed from the case rear, the arrow key 21 is located to the right and the operation buttons 26 are to the left on the case top. The two analog sticks 27 are arranged between the arrow key 21 and the operation buttons 26.

The controller 20 of the embodiment has a first LED 210a, a second LED 210b, a third LED 210c, and a fourth LED 210d, which are arranged in a horizontal row in an upper right area of the case rear 29 with respect to the longitudinal center. Hereinafter, the first LED 210a, the second LED 210b, the third LED 210c, and the fourth LED 210d will be written as "LEDs 210" or when referred to collectively. Numerals are inscribed or printed near the LEDs 210. For example, the LEDs 210 are used for indicating a controller number which is connected with a game character. A USB connector 46 is provided in the center of the case rear 29. A USB cable extended from the game apparatus 10 can be plugged into the USB connector 46 for the purpose of charge processing on the controller 20. It should be appreciated that the controller 20, when connected with the USB cable, may be used as a wired controller.

An upper operation button 220a, an upper operation button 220b, a lower operation button 230a, and a lower operation button 230b are provided on the case rear 29 at horizontally symmetrical positions in the longitudinal direction of the case rear. The upper operation button 220a and the upper operation button 220b are positioned so that they are operated with the tips of the forefingers of the right hand and the left hand, respectively, when the user holds the right grip 28a and the left grip 28b. The lower operation button 230a and the lower operation button 230b are positioned so that they are operated with the tips of the middle fingers of the right hand and the left hand, respectively. This prevents the LEDs 210 from being covered by the forefingers or middle fingers when the user operates the upper operation button 220a, the upper operation button 220b, the lower operation button 230a, and the lower operation button 230b.

In the controller 20 of the embodiment, the upper operation button 220a and the upper operation button 220b are configured as push buttons. Inputs from the upper operation buttons 220 are made by depressing them, which allows analog inputs according to the amounts of depression. The upper operation buttons 220 are urged outwardly from the case by rubber or other elastic bodies. Consequently, when not depressed by a user, the upper operation buttons 220 are urged away from the case and remain at extended positions.

The lower operation button 230a and the lower operation button 230b are formed as trigger buttons which are supported rotatably. The lower operation buttons 230 are rotatable input interfaces, and allow analog inputs according to the amounts of rotation. The lower operation buttons 230 are rotatably supported by rotation shafts, and are urged outwardly from the case by rubber or other elastic bodies or by spring members. As a result, when not depressed by the user, the lower operation buttons 230 are urged away from the case and remain at extended positions.

The lower operation buttons 230 are rotatably supported by the rotation shafts which are situated substantially in parallel with the longitudinal direction of the case rear 29. The lower operation buttons 230 are pivotally supported at their top portions, and the user can depress the lower areas of the surfaces of the lower operation buttons 230 so that the lower operation buttons 230 rotate in such a way as to retract into the case. Projecting parts 240 are formed on the bottom ends of the surfaces of the lower operation buttons 230. The projecting parts 240 are sloped so as to be closer to the case when not depressed. The projecting parts 240 are thus located closer to the bottom of the case than the rotation shafts are.

The lower operation buttons 230a and 230b are arranged horizontally symmetrically. The lower operation button 230a has a projecting part 240a, and the lower operation button 230b has a projecting part 240b. The projecting parts 240 are provided as extensions of the surfaces of the lower operation buttons 230 such that convex surfaces are formed facing outwardly from the case between the respective top ends and bottom ends of the operation buttons 230. That is, the surfaces of the lower operation buttons 230 are configured to smoothly curve towards the direction of rotation. For the purpose of preventing the middle fingers from slipping, the surfaces 234a of the lower operation buttons 230 (see FIGS. 6A and 6B) may be provided with anti-slip protrusions or grooves substantially parallel to the longitudinal direction of the case rear 29. Alternatively, the surfaces of the lower operation buttons 230 may be made of less slippery materials. The surfaces may also be grained. The projecting parts 240 may be increased in length so that the middle fingers can be stably positioned thereon.

It should be appreciated that the projecting parts 240 may be configured so that their surfaces protrude in a direction away from the rotation shafts. Here, the projecting parts 240 are formed to curve to outside the case with respect to the other surface areas above. If such outward-curving projecting parts 240 are formed as part of the surfaces of the lower operation buttons 230, the middle fingers can be guided into appropriate positions where the user can apply force efficiently when rotating the lower operation buttons 230. This improves the engagement of the middle fingers, and prevents the middle fingers from slipping. The projecting parts 240 may be shaped to protrude and bulge out from the other curved surfaces along their bottom ends. This can further improve the engagement of the middle fingers.

The projecting parts 240 formed at the bottom ends of the surfaces of the lower operation buttons 230 may be projected downward (toward the bottom) below the surrounding areas of the case when viewed from the rear. When putting their middle fingers on the lower operation buttons 230, more than a few users would move the middle fingers along the bottom of the controller 20 to reach the lower operation buttons 230. In such cases, the middle fingers moved along the bottom can reach the lower operation buttons 230 easily if the projecting parts 240 extend beyond the case to form part of the outline of the controller 20. In addition, when the surfaces of the lower operation buttons 230 are formed as continuous convex surfaces, it is possible to move the middle fingers along the projecting parts 240 to reach the predetermined surface positions naturally.

In the present embodiment, sensors for detecting a change in resistance are used as a rotation amount detecting unit of the lower operation buttons 230. For example, the case is provided with an internal circuit pattern which establishes conduction between two terminals with a predetermined resistance value. Then, conductive rubber is arranged so that it is pressed against the circuit pattern by a rotating operation on a lower operation button 230. When the lower operation button 230 is rotated, the conductive rubber comes into contact with the circuit pattern inside the case. The conductive rubber piece is formed so that it can be deformed to change its contact area with the circuit pattern in accordance with to the amount of rotation. Then, the resistance between the two terminals varies with the amount of rotation. This resistance can be detected to monitor the amount of rotation, whereby the controller 20 can acquire an input value in accordance with the amount of rotation. Similarly, sensors for detecting a change in resistance are also used as a depression amount detecting unit of the upper operation buttons 220.

Figure 4A:
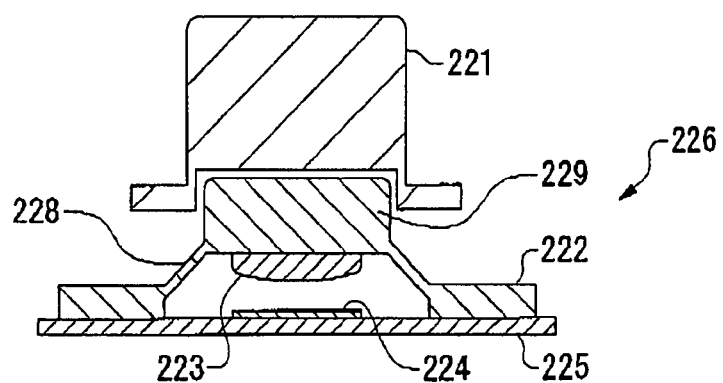
FIGS. 4A to 4C are diagrams showing the basic structure of a sensor to be employed as a rotation amount detecting unit and a depression amount detecting unit according to the present embodiment.
Figure 4B:
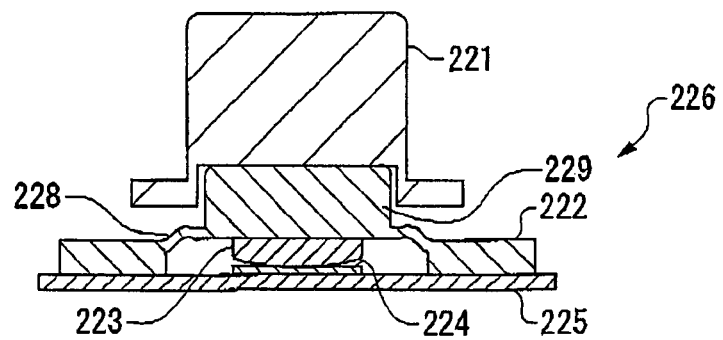
Figure 4C:
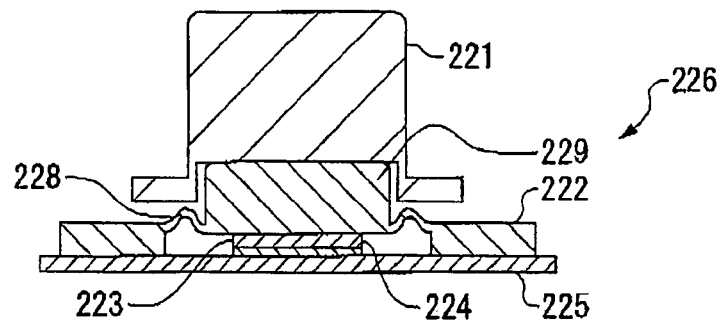

FIGS. 4A to 4C show the basic structure of a sensor 226 to be used as the rotation amount detecting unit and the depression amount detecting unit according to the present embodiment. This sensor 226 is arranged inside the case, in front of a lower operation button 230 in the direction of rotation or in front of an upper operation button 220 in the direction of depression.

An operator 221 is an operation button which corresponds to a lower operation button 230 in the case of the rotation amount detecting unit, and an upper operation button 220 in the case of the rotation amount detecting unit. The sensor 226 includes an elastic body 222, a conductive member 223, and a resistor 224. The operator 221 is depressed to push a contact 229 of the elastic body 222 downward. The conductive member 223 is made of conductive rubber having elasticity. In the configuration example shown in FIGS. 4A to 4C, the conductive member 223 is shaped like a mound with its top at the center. This conductive member 223 is adhered to the inner ceiling surface of an elastic part 228 formed on the elastic body 222. The elastic body 222 supports and urges the operator 221 upward by means of the elastic part 228.

The resistor 224 is formed on an internal substrate 225 and is opposed to the conductive member 223. It should be appreciated that the resistor 224 may be formed directly on the internal substrate 225 as a circuit pattern, or may be printed on a sheet which is in turn placed on the internal substrate 225. The resistor 224 is placed in a position where the conductive member 223 will come into contact with in accordance with the pressing operation on the operator 221. The conductive member 223 is made of a material that can be deformed in accordance with the pressing force from the operator 221 (i.e., the contact pressure against the resistor 224).

FIG. 4A shows the state before the operator 221 is depressed. FIG. 4B shows the state where the operator 221 is depressed with a weak pressing force. FIG. 4C shows the state where the operator 221 is depressed with a strong pressing force. As shown in FIGS. 4B and 4C, the contact area between the resistor 224 and the conductive member 223 varies with the pressing force. More specifically, when the pressing force on the operator 221 is weak, the mound-shaped conductive member 223 makes contact in the vicinity of its top as shown in FIG. 4B. When the pressing force on the operator 221 increases, the conductive member 223 deforms gradually from the top with a corresponding increase in the contact area. The contact area reaches its maximum in the state shown in FIG. 4C.

Figure 5:
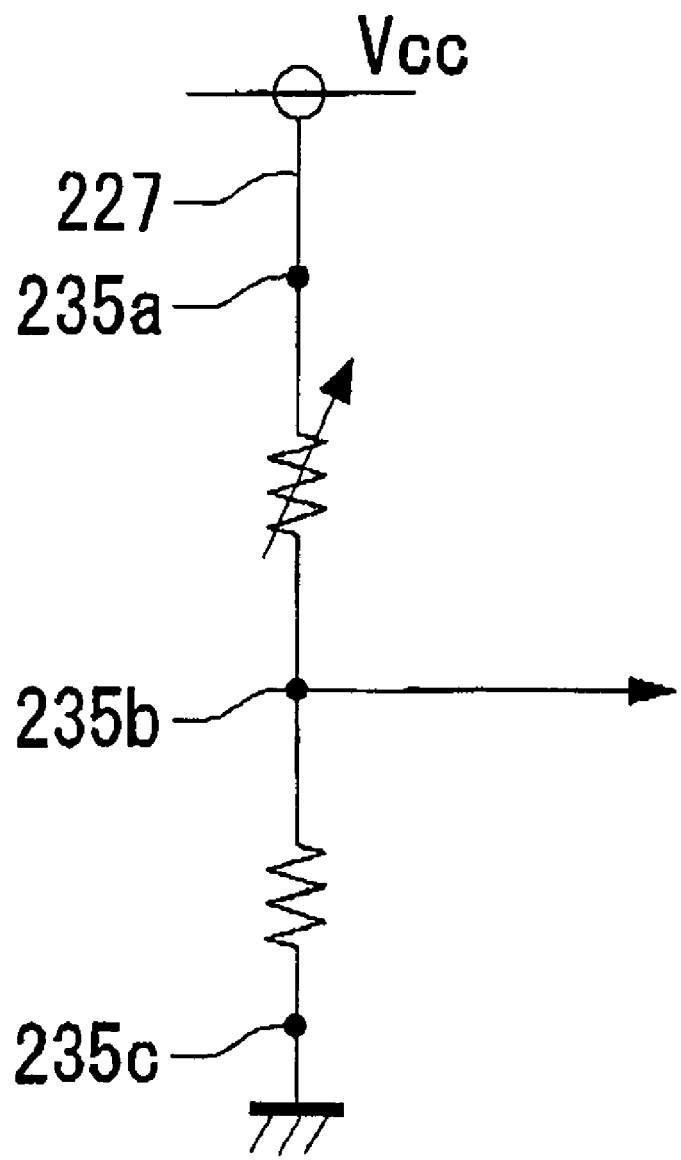
FIG. 5 is a diagram for explaining the combined resistance of a resistor and a conductive member.

FIG. 5 is a diagram for explaining the combined resistance of the resistor and the conductive member. As shown in the diagram, the resistor 224 is inserted in series into a power supply line 227, and the voltage is applied to across electrodes 235a and 235c. As schematically shown in the diagram, the internal resistance of this resistor 224 is divided into a fixed resistor (between 235b and 235c) and a variable resistor (between 235a and 235b). Of these, the variable resistor component corresponds to the contacting part of the conductive member 223, and its resistance varies with the contact area with the conductive member 223. That is, when the conductive member 223 comes into contact with the resistor 224, the conductive member 223 forms a bridge to pass electric current and thus lowers the resistance of the contacting part. Consequently, the larger the contact area with the conductive member 223 is, the lower the resistance of the resistor 224 becomes. The resistor 224 has an output terminal 235b in the middle. An analog signal (voltage value) corresponding to the pressing force from the operator 221 is output from this output terminal 235b.

Figure 6A:
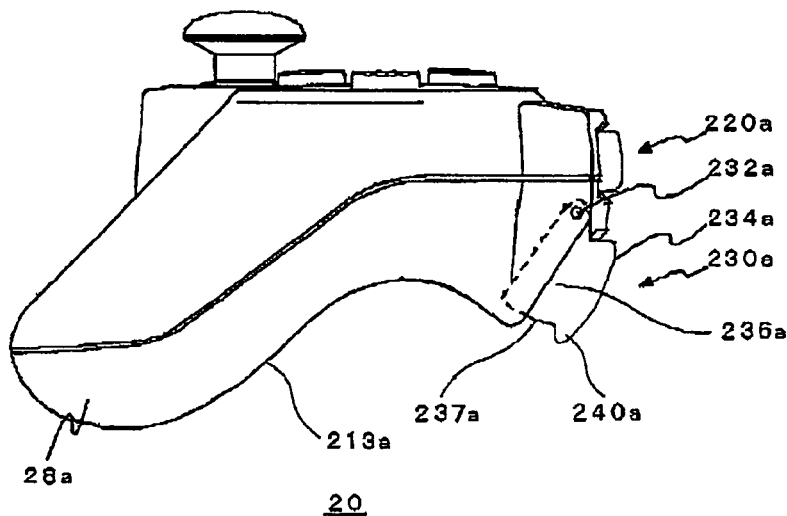
FIGS. 6A and 6B are diagrams showing the appearance and configuration of the controller according to the embodiment sideways.
Figure 6B:
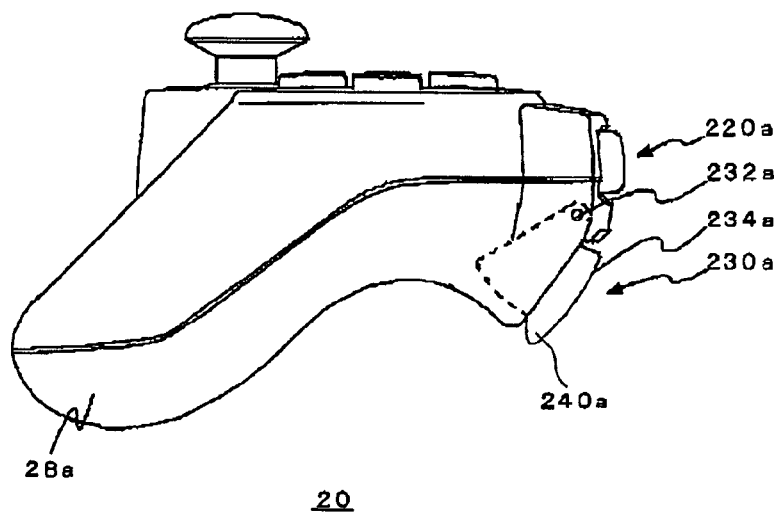

FIGS. 6A and 6B show the appearance and configuration of the controller 20 according to the embodiment from one side. It should be appreciated that while FIGS. 6A and 6B show the lower operation button 230a that is visible from the right side of the controller 20, the lower operation button 230b that is visible from the left side also has the same structure.

FIG. 6A shows the state where the lower operation button 230a is not rotated. FIG. 6B shows the state where the lower operation button 230a is rotated to the maximum extent. The surface 234a of the lower operation button 230a is formed as a smooth convex surface, and the projecting part 240a is formed on the bottom end thereof.

The distance from the rotation shaft 232a to the extremity of the projecting part 240a is set to be greater than the distance to the peripheral area 237a of a body part 236a to be retracted into the case when the lower operation button 230a is pushed in. The body part 236a is retracted into the case through an opening in the case. The projecting part 240a is formed by extending the surface 234a so as to make contact with the opening. As shown in FIG. 6B, when rotated, the projecting part 240a comes into contact with the outer surface of the case, or the rim of the opening in particular, to limit the rotating operation, thereby functioning as a stopper. Suppose that there were no projecting part 240a, and the lower operation button 230a were rotated and fully pushed into the case. In such situations, it might sometimes be impossible to pull out the lower operation button 230a if foreign objects were to be lodged between the lower operation button 230a and the opening. The entire lower operation button 230a might become lodged inside the case and not be able to pull out at all for some reason. In contrast, if the projecting part 240a which functions as a stopper is provided as with the controller 20 of the embodiment, the lower operation button 230a is precluded from being fully pushed into the case. This produces the advantage that the foregoing situations can be avoided. Moreover, as shown in FIG. 6A, clearance is formed between the rear-side edge of the bottom 213a and the projecting part 240a when the user does not operate the lower operation button 230a. The clearance can be used for a space where the user put the middle finger contacting the peripheral area 237a so that gripping feeling is improved.

The bottom 213a of the controller 20 is preferably shaped into a smoothly curved surface. In the side views shown in FIGS. 6A and 6B, the right grip 28a makes a curved surface of S shape at the bottom of the case. When the middle finger is moved along the case bottom to reach the surface 234a of the lower operation button 230a, the smoothly-shaped case bottom can thus facilitate movement of the middle finger. Here, the lower operation button 230a may be urged outwardly from the case by a spring member and the lower end of the projecting part 240a may be situated on an extension of the bottom 213a near the lower operation button 230a. This can allow smooth movement of the middle finger from the bottom 213a of the case in the vicinity of the lower operation button 230a onto the lower operation button 230a.

Figure 7:
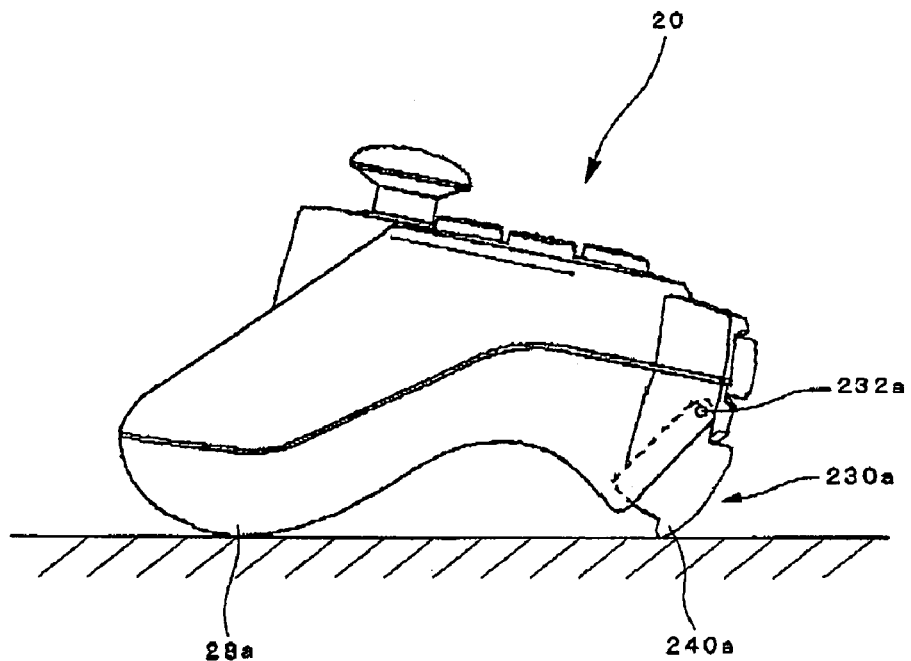
FIG. 7 is a diagram showing a state where the controller is placed on a flat surface such as a floor and the ground.

FIG. 7 shows the state where the controller 20 is placed on a flat surface, such as a floor or the ground, with the projecting parts 240 downwards. Here, part of the right grip 28a and the left grip 28b, and the lower ends of the projecting parts 240a and 240b are in contact with the flat surface, whereby the controller 20 is stably supported so as to remain in the placed position. As shown in the diagram, the projecting part 240a is sloped to smoothly curve towards the case, with respect to the direction perpendicular to the flat surface when placed, as approaching from the rotation shaft 232a to the lower end. Thus, if the case top 30 of the controller 20 is pressed downward when in the placed state of FIG. 7, force is applied to the projecting part 240a in such a direction that the lower operation button 230a rotates into the case. Consequently, even if the case top 30 is subjected to accidental force, the spring member and the like inside the lower operation button 230a can function to absorb this force. The lower operation button 230a can thus be made less susceptible to damage.

Figure 8:
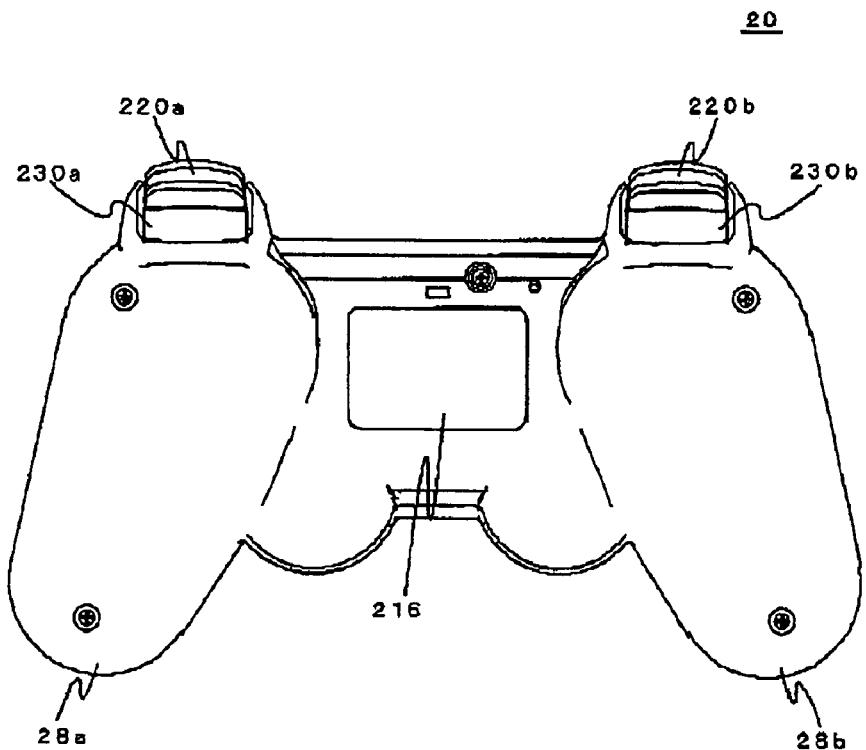
FIG. 8 is a diagram showing the appearance and configuration of the controller from the bottom.

FIG. 8 shows the appearance and configuration of the controller 20 from underneath. At the bottom, the right grip 28a and the left grip 28b have generally cylindrical surfaces for the sake of easy gripping. The borders between the right grip 28a, the left grip 28b, and the center part of the case bottom are preferably formed smoothly, without a step in the connecting areas between the grips and the center part. This makes it possible to form the entire bottom with a smooth continuous surface, thereby allowing smooth finger movement as mentioned previously. The center part between the right grip 28a and the left grip 28b is shaped so as to be flat all over. The controller 20 contains a battery. A battery lid 216 may be formed in the case bottom.

Figure 9:
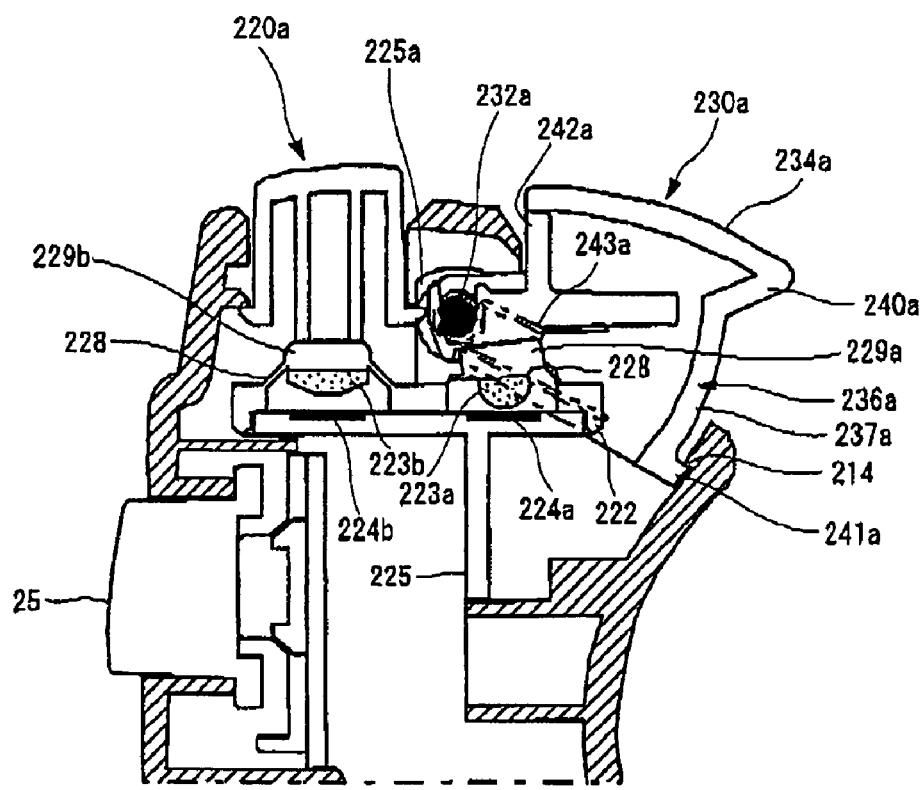
FIG. 9 is a diagram showing the internal structure in the periphery of an upper operation button and a lower operation button.

FIG. 9 shows a cross section of the internal structure in the periphery of an upper operation button and a lower operation button. Sensors shown in FIG. 4 are arranged in the direction of depression of the upper operation buttons 220 and in the direction of rotation of the lower operation buttons 230. The sensors output analog signals according to the amount of depression or the amount of rotation. The upper operation buttons 220, the lower operation buttons 230, and the sensors function as operating devices for accepting operation inputs from the user.

Initially, a description will be given of the structure of the upper operation buttons 220. An upper operation button 220 has a contact part which extends from its surface into the case. The extremity of the contact portion is in contact with the top of a contact 229b which is formed on the elastic body 222. The contact 229b is urged outwardly from the case, i.e., in the direction away from the resistor 224b by the elastic body 228. The elastic conductive member 223b is formed on the underside (inner ceiling surface) of the contact 229b. This conductive member 223b is opposed to the resistor 224b which is arranged on the internal substrate 225. When the upper operation button 220a is depressed, the contact area between the conductive member 223b and the resistor 224b changes and the resistor 224b outputs an analog signal according to the contact area. In this way, the upper operation button 220a can be operated as an operator capable of making an analog input.

A description will now be given of the structure of the lower operation buttons 230. The internal substrate 225 is provided with a holder member 225a which projects in a direction perpendicular to the surface where the resistor 224 is formed, and which is intended to support a shaft. The rotation shaft 232a is supported by this holder member 225a. Shaft holes are formed in both sidewalls of the lower operation button 230a, and the rotation shaft 232a is inserted through the shaft holes in the sidewalls.

The lower operation button 230a has the projecting part 240a which extends from the surface 234a, The projecting part 240a is formed to protrude beyond the peripheral area 237a of the body part 236a. The lower operation button 230a is configured as a hollow box, having the following four sides: the surface 234a which serves as a pressing surface; the sidewalls which have the shaft holes in them and extend generally perpendicularly from both sides of the surface 234a; and a rear which is formed to make the peripheral area 237a from the lower end of the projecting part 240a. A contact piece 242a is fixed to inside the lower operation button 230a. The contact piece 242a is intended to make contact with a contact 229a formed on the elastic body 222. The contact piece 242a is composed of a bearing part which accommodates the rotation shaft 232a, and a plate part which extends from the bearing part. The plate part is inserted into guides which are formed on the lower operation button 230a. In this state, the rotation shaft 232a is inserted through the shaft holes in both sidewalls of the lower operation button 230a. The rotation shaft 232a is accommodated in the bearing part of the contact piece 242a, and the contact piece 242a is fixed to the lower operation button 230a. Consequently, the contact piece 242a is rotated together with the lower operation button 230a. It should be appreciated that the contact piece 242a and the lower operation button 230a may be fixed by other means such as an adhesive, or may be formed integrally. In either case, the contact piece 242a and the lower operation button 230a are rotated together.

The contact piece 242a has a wall part which extends generally perpendicularly from the plate part. This wall part provides a surface opposite to the rear of the lower operation button 230a when the contact piece 242a is fixed to the lower operation button 230a. By this configuration, all the externally exposed areas of the lower operation button 230a are closed off with surfaces or walls. The contact piece 242a has a flat contact surface, and makes a slidable contact with the flat top of the contact 229a. The contact surface is formed on the plate part, between the bearing part and a position at which the wall part is joined on. The contact surface 233 (see FIG. 13) of the contact piece 242a is made wider than the top of the contact 229a so that the top of the contact 229a can slide over favorably.

The projecting part 240a is formed as an extension of the surface 234a. The rear of the projecting part 240a facing toward the peripheral area 237a is shaped so that the middle finger moved along the case bottom from the peripheral area 237a to the projecting part 240a will not be hooked by the projecting part 240a which protrudes from the peripheral area 237a. That is, the rear of the lower operation button 230a is shaped to form an obtuse angle at the border between the peripheral area 237a and the projecting part 240a, so that the finger can be moved smoothly from the peripheral area 237a to the projecting part 240a.

The contact 229a is urged outwardly from the case, i.e., in the direction away from the resistor 224a, by the elastic body 228. A conductive member 223a having elasticity is formed on the underside (inner ceiling surface) of the contact 229a. This conductive member 223a is opposed to the resistor 224a which is arranged on the internal substrate 225. When the lower operation button 230a is caused to rotate, the conductive member 223a comes into contact with the resistor 224a. The conductive member 223a has elasticity and is capable of deformation. The contact area between the conductive member 223a and the resistor 224a varies with the amount of rotation of the lower operation button 230a, and the resistor 224a outputs an analog signal according to the contact area. In this way, the lower operation button 230a can thus be operated as an operator capable of making an analog input.

The conductive member 223a is shaped like a mound with its top at the center. The conductive member 223a is attached to the underside of the contact 229a of the elastic body 222 so that the mound top is opposed to the resistor 224a. When the amount of rotation of the lower operation button 230a increases, the conductive member 223a can thus be deformed gradually from the top with an increase in the contact area between the conductive member 223a and the resistor 224a. It should be appreciated that the conductive member 223a may be shaped like a bowl with its top at the center. Other shapes having a top at the center, such as a circular cone and a pyramid, may also be used.

The contact piece 242a makes contact with the top of the contact 229a in a position near the rotation shaft 232a. The contact piece 242a rotates about the rotation shaft 232a along with the lower operation button 230a. Thus, the conductive member 223a will have to travel by being pressed by a larger distance if the contact piece 242a makes contact with the contact 229a in a position farther from the rotation shaft 232a. This requires that the conductive member 223a be made of a highly deformable material since the contact area between the conductive member 223a and the resistance 224a must change according to the amount of rotation of the lower operation button 230a.

When the contact piece 242a and the contact 229a are put into contact near the rotation shaft 232a, on the other hand, it is possible to reduce the maximum amount of pressing of the conductive member 223a. This can increase the freedom of selection of the materials suitable for the conductive member 223a. It should be appreciated that the contact surface where the contact piece 242a makes contact with the contact 229a is preferably positioned, for example, closer to the rotation shaft 232a than the midpoint between the rotation shaft 232a and the peripheral area 237a. This can reduce the maximum amount of squeeze of the conductive member 223a. Moreover, when the contact 229a is positioned to the bottom of the contact piece 242a, it is possible to make the elastic body 222 smaller. This can reduce the amount of material for constituting the elastic body 222, and allow efficient use of the space as well.

The lower operation button 230a is urged in the direction away from the resistor 224a by the elastic body 222. A spring member 243a may be provided to assist this urging force. The spring member 243a is attached to the rotation shaft 232a with one end in contact with the contact piece 242a and the other end in contact with the internal substrate 225, so that an expanding force is produced to urge the contact piece 242a outwardly from the case and the internal substrate 225 inwardly with regard to the case. The lower operation button 230a can thus be urged in a direction away from the internal substrate 225. As a result, the lower operation button 230a can be suitably maintained in a position projecting from the case when not operated to rotate.

Note that the peripheral area 237a of the lower operation button 230a has a projection 241a at a position opposite from the projecting part 240a, i.e., where to be retracted into the case. A latch part 214 is formed inside the case, so that the latch part 214 and the projection 241a latch each other to limit the movement of the lower operation button 230 outwardly from the case.

Figure 10:
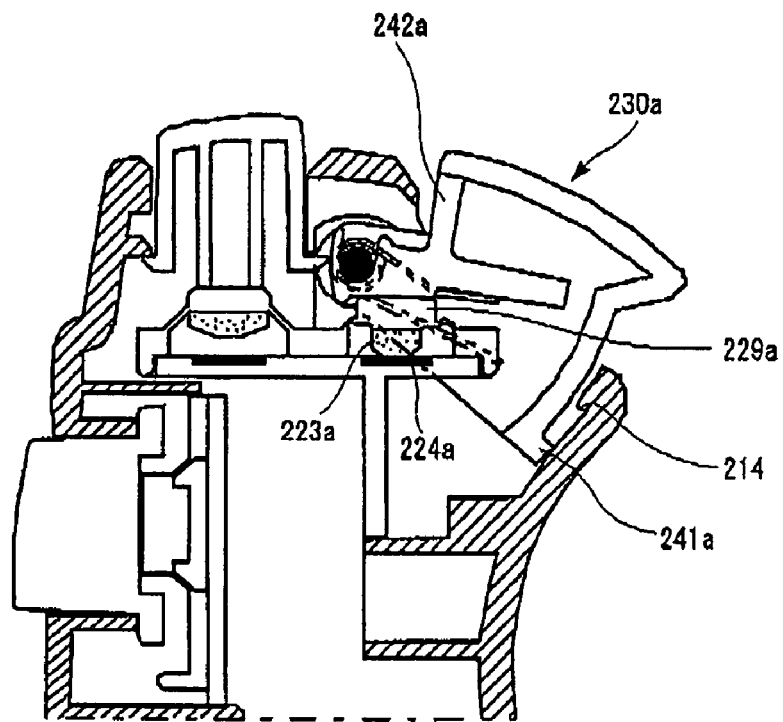

FIG. 10 shows, in cross-sectional view, the state where the lower operation button is pressed in. When the lower operation button 230a is operated to rotate, the latch part 214 and the projection 241a are unlatched and the contact 229a is pressed in toward the resistor 224a as much as the amount of rotation of the contact piece 242a at the contact position. Consequently, the conductive member 223a and the resistor 224a come into contact with each other, and the resistor 224a outputs an analog signal according to the contact area.

Figure 11:
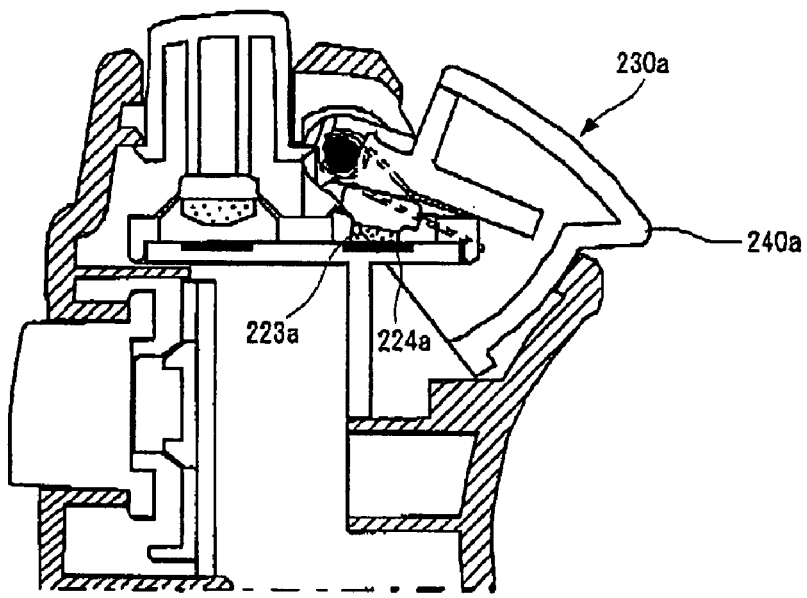
FIG. 11 is a diagram showing the state where the lower operation button is pressed in as much as the maximum amount of rotation.

FIG. 11 shows, in cross-sectional view, the state where the lower operation button is pressed in by the maximum amount of rotation. In this state, the projecting part 240a is in contact with the outer periphery of the case, thereby limiting the rotating operation. Here, the contact area between the conductive member 223a and the resistor 224a is at its maximum, and the resistor 224a outputs the maximum analog signal.

Figure 12:
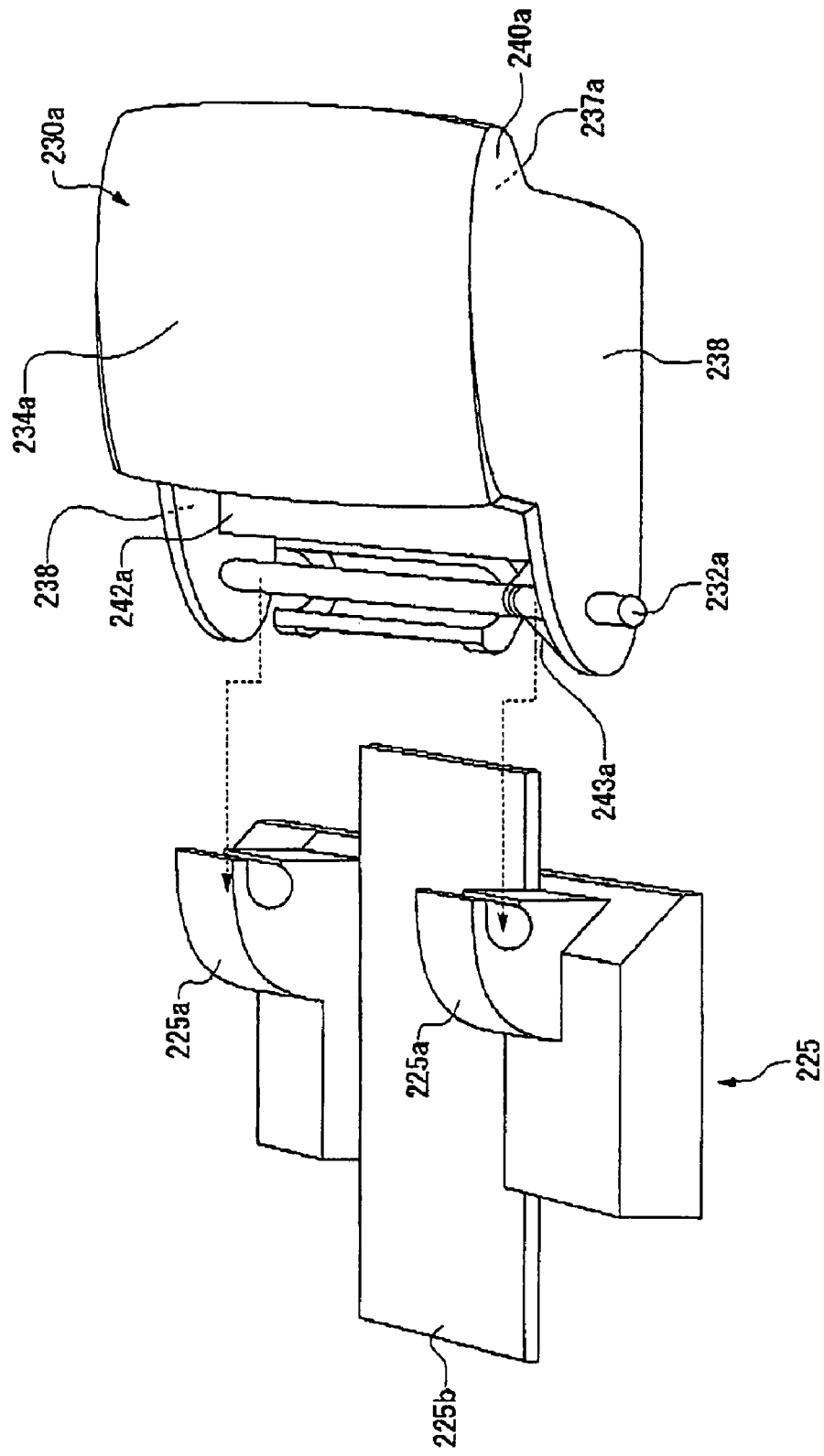
FIG. 12 is a diagram showing the rotating structure of the lower operation button.

FIG. 12 shows the rotating structure of the lower operation button. The lower operation button 230a is formed as a box, having the following four sides: the surface 234a; the rear which includes the peripheral area 237a; and the two sidewalls 238 which are continuous with the surface 234a and the rear. The contact piece 242a is attached inside the box of the lower operation button 230. The rotation shaft 232a is inserted through the shaft holes which are formed in the sidewalls 238 of the lower operation button 230a. The spring member 243a is attached to the rotation shaft 232a. A single spring member 243a may be used as shown in the diagram. Alternatively, two spring members 243a may be provided across the bearing part of the contact piece 242a.

The rotation shaft 232a is pivotally mounted in hole portions of the holder member 225a. Each hole portion has a diameter capable of accommodating the rotation shaft 232a, and has an opening which is made slightly smaller than the diameter of the rotation shaft 232a. The rotation shaft 232a can thus be fit into and supported by the holder members 225a. By this means, the lower operation button 230a is rotatably attached to the internal substrate 225. The internal substrate 225 has a flat part 225b for the elastic body 222 (not shown) to be placed on. The flat part 225b supports one end of the spring member 243a. It should be appreciated that the other end of the spring member 243a is supported by the bottom of the contact piece 242a. Note that the internal substrate 225 is common between the lower operation button 230a and the upper operation button 220a, though not shown in the diagram. The left side of the internal substrate 225 is thus provided with a structure for attaching the upper operation button 220a.

Figure 13:
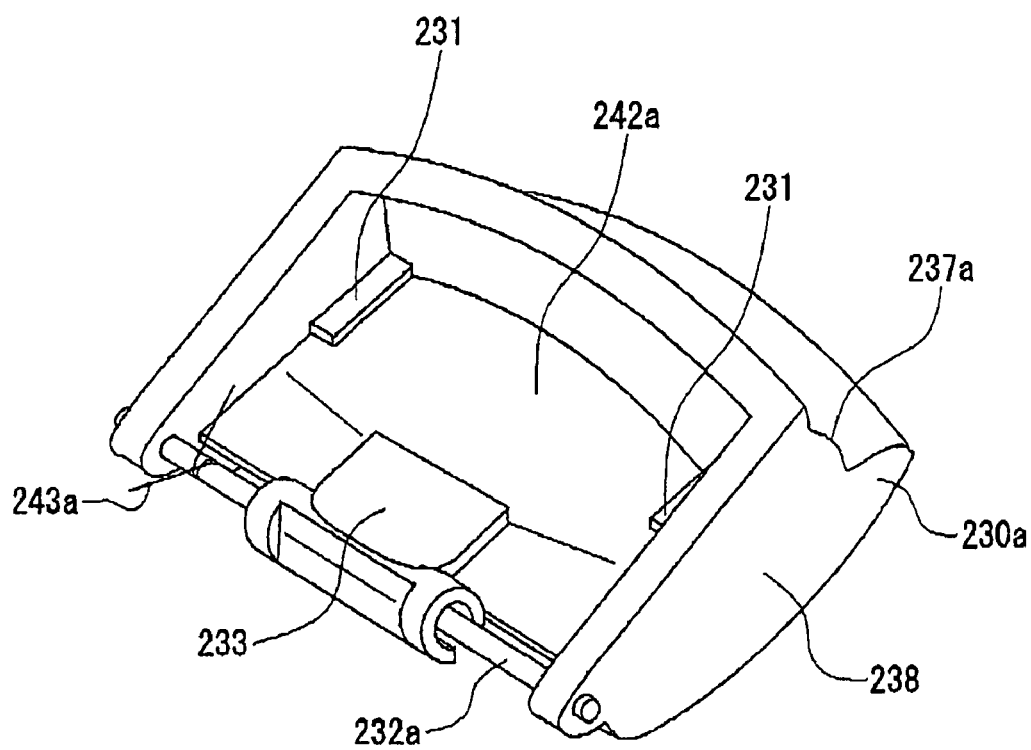
FIG. 13 is a diagram showing the structure of the lower operation button from the bottom.

FIG. 13 shows the rotating structure of the lower operation button from the bottom. Parallel guides 231 for attaching and fixing the contact piece 242a are formed on both the sidewalls inside the lower operation button 230a. Both the sides of the plate part of the contact piece 242a are inserted into the parallel guides 231. The contact piece 242a has the contact surface 233 which makes contact with the contact 229a of the elastic body 222.

The contact surface 233 is formed flat and at a given angle to the bottom area of the contact piece itself so that the contact 229a of the elastic body 222 is located in a predetermined position with respect to the resistor 224a before being pressed. This predetermined position is determined so as to allow an appropriate amount of play. As a result, a desired analog output can be obtained by a rotating operation on the lower operation button 230a.

Up to this point, the present invention has been described in conjunction with the embodiment thereof. This embodiment is given solely by way of illustration. It will be understood by those skilled in the art that various modifications may be made to combinations of the foregoing components and processes, and all such modifications are also intended to fall within the scope of the present invention.

What is claimed is:

1. An operating device comprising:
    an operation button supported by a rotation shaft so as to be capable of a rotating operation;
    a resistor arranged on a substrate; and
    a conductive member to be pressed against the resistor by the rotating operation on the operation button, the conductive member having elasticity, wherein
    the resistor outputs an analog signal in accordance with the size of a contact area with the conductive member,
    the conductive member is shaped like a mound with its top at the center,
    the conductive member is attached to an elastic body so that the top is opposed to the resistor, the elastic body urging the operation button in a direction away from the resistor,
    a contact piece for making contact with the elastic body is arranged inside the operation button, and
    the contact piece makes contact with the elastic body at a position near the rotation shaft.

2. The operating device according to claim 1, wherein a projecting part is formed on a bottom end of the surface of the operation button.

3. The operating device according to claim 2, wherein the operation button is configured as a hollow box, having the following four sides: a surface which is pressed by a user; sidewalls which have shaft holes and extend substantially perpendicularly from both sides of the surface; and a rear which is formed to make a peripheral area from the lower end of the projecting part.

4. The operating device according to claim 1, wherein the contact piece rotates about the rotation shaft along with the operation button.

5. The operating device according to claim 4, wherein a contact surface where the contact piece makes contact with the elastic body is positioned closer to the rotation shaft than the midpoint between the rotation shaft and the peripheral area of the operation button.

6. The operating device according to claim 5, wherein a spring member is attached to the rotation shaft with one end in contact with the contact piece and the other end in contact with the substrate which supports the elastic body, so that the operation button is urged in a direction away from the substrate.

7. The operating device according to claim 1, wherein a spring member which urges the operation button in the direction away from the substrate is attached to the rotation shaft.

8. The operating device according to claim 1, wherein two operation buttons are provided on a case rear at horizontally symmetrical positions in the longitudinal direction of the case rear and positioned so that they are operated with tips of middle fingers of the right hand and the left hand, respectively.

9. A game controller implementing an operating device, the operating device comprising:
    an operation button supported by a rotation ,shaft so as to be capable of a rotating operation;
    a resistor arranged on a substrate; and
    a conductive member to be pressed against the resistor by the rotating operation on the operation button, the conductive member having elasticity, wherein
    the resistor outputs an analog signal in accordance with the size of a contact area with the conductive member,
    the conductive member is shaped like a mound with its top at the center,
    the conductive member is attached to an elastic body so that the top is opposed to the resistor, the elastic body urging the operation button in a direction away from the resistor,
    a contact piece for making contact with the elastic body is arranged inside the operation button, and
    the contact piece makes contact with the elastic body at a position near the rotation shaft.

10. The operating device according to claim 2, wherein the surface of the operation button is configured to smoothly curve towards the direction of rotation.

11. The operating device according to claim 2, wherein when the operation button is rotated, the projecting part comes into contact with an outer surface of a case to limit the rotating operation.

* * * * *